United States Patent
Nagamine et al.

(10) Patent No.: US 7,355,653 B2
(45) Date of Patent: Apr. 8, 2008

(54) VIDEO SIGNAL PROCESSING CIRCUIT AND VIDEO SIGNAL PROCESSING METHOD

(75) Inventors: Takatomo Nagamine, Chiba (JP); Takahiko Tamura, Tokyo (JP); Jun Ueshima, Tokyo (JP)

(73) Assignee: Sony Corporation (JP)

( * ) Notice: Subject to any disclaimer, the term of this patent is extended or adjusted under 35 U.S.C. 154(b) by 554 days.

(21) Appl. No.: 10/511,733

(22) PCT Filed: Feb. 9, 2004

(86) PCT No.: PCT/JP2004/001335

§ 371 (c)(1),
(2), (4) Date: Oct. 18, 2004

(87) PCT Pub. No.: WO2004/080085

PCT Pub. Date: Sep. 16, 2004

(65) Prior Publication Data

US 2005/0162561 A1    Jul. 28, 2005

(30) Foreign Application Priority Data

Mar. 4, 2003  (JP)  ............................. 2003-057005
Dec. 18, 2003  (JP)  ............................. 2003-420671

(51) Int. Cl.
*H03L 7/00*   (2006.01)
(52) U.S. Cl. ...................... 348/549; 348/638; 348/639; 348/441

(58) Field of Classification Search ................. 348/572, 348/625, 630, 450, 453, 441, 638–641, 505–509, 348/727, 663; *H03L 7/00*
See application file for complete search history.

(56) References Cited

U.S. PATENT DOCUMENTS

| | | | |
|---|---|---|---|
| 5,912,714 A | 6/1999 | Kawamura | |
| 6,285,402 B1 * | 9/2001 | Miyazaki et al. | 348/445 |
| 6,441,860 B1 * | 8/2002 | Yamaguchi et al. | 348/555 |
| 6,833,875 B1 * | 12/2004 | Yang et al. | 348/665 |
| 7,224,407 B2 * | 5/2007 | Yoshii et al. | 348/638 |

FOREIGN PATENT DOCUMENTS

| | | |
|---|---|---|
| EP | 0762782 | 3/1997 |
| EP | 1 085 766 | 3/2001 |
| JP | 2000-013813 | 1/2000 |
| JP | 2000-253417 | 9/2000 |
| JP | 2001-095005 | 4/2001 |

* cited by examiner

*Primary Examiner*—Trang U. Tran
(74) *Attorney, Agent, or Firm*—Lerner, David, Littenberg, Krumholz & Mentlik, LLP

(57) ABSTRACT

When an A/D-converted composite video signal is directly outputted while a system clock frequency is switched so as to execute the determination of a signal system, a digital chroma demodulation system prevents the images displayed by the composite video signals from being distorted in accordance with a switching of the frequency of a system clock. The frequency m (=fsc×n) of the system clock is synchronized with a color burst signal and is set to fall in a predetermined range by changing a coefficient n in accordance with the system color burst signal freguency. Thus, since a composite video signal is A/D-converted in accordance with a substantially constant sampling frequency, the sampling condition such as a sampling frequency and a sampling point is not greatly changed.

7 Claims, 7 Drawing Sheets

FIG.6

| TELEVISION SYSTEM | fsc FREQUENCY(MHz) | 4fsc(MHz) | SYSTEM CLOCK(MHz) |
|---|---|---|---|
| NTSC | 3.58 | 14.32 | 71.6(=20fsc) |
| NTSC-443 | 4.43 | 17.72 | 70.88(=16fsc) |
| PAL | 4.43 | 17.72 | 70.88(=16fsc) |
| PAL-M | 3.58 | 14.32 | 71.6(=20fsc) |
| PAL-N | 3.58 | 14.32 | 71.6(=20fsc) |
| PAL60 | 4.43 | 17.72 | 70.88(=16fsc) |
| SECAM | 4.43 | 17.72 | 70.88(=16fsc) |

VIDEO SIGNAL PROCESSING CIRCUIT AND VIDEO SIGNAL PROCESSING METHOD

TECHNICAL FIELD

The present invention relates to a video signal processing circuit which has a circuit configuration for separating a luminance signal and a chroma signal by means of so-called YC separation, for example, from a video signal (composite video signal) and also performing a demodulation process on this separated chroma signal, and to a method of the same.

BACKGROUND ART

In a television receiver, a monitor apparatus and the like, for example, a chroma demodulation system is provided for separating a luminance signal (Y-signal) and a chroma signal (C-signal) from an input composite video signal, and further demodulating a color difference signal from the chroma signal. In recent years, the above-mentioned chroma demodulation system is constituted by a digital circuit, so that the chroma demodulation carried out by a digital signal process has been proposed and also executed.

The above-mentioned digital chroma demodulation system executes, for example, a Y/C separation for separating into a luminance signal and a chroma signal after converting an input analog composite video signal into a digital signal, and also performs the chroma demodulation process on the separated chroma signal and consequently generates color difference signals Cb, Cr. As a result, the digital chroma demodulation system outputs the luminance signal and color difference signals, which are necessary for a color image display.

Then, as a system clock to operate the above-mentioned digital chroma demodulation system, for the necessity of extracting the color difference signal, an operation is carried out for synchronizing with a color burst signal which is superimposed on the composite video signal. In this case, the system clock for the digital chroma demodulation system is generated by carrying out the operation so as to lock a PLL circuit in synchronization with the color burst signal extracted from the composite video signal.

In addition, the frequency of the system clock for the digital chroma demodulation system as mentioned above is set to 4 fsc which is equal to 4 times the frequency fsc of the color burst signal, in many cases. This is because when it is considered that sampling is executed so as to obtain the quality which is said to be sufficiently high with regard to the luminance signal and color difference signal in the digital chroma demodulation system, as the frequency obtained after the multiplication of the frequency fsc of the color burst signal, 4 fsc is the minimum necessary frequency.

A block diagram of FIG. 7 schematically shows one example of the digital chroma demodulation system based on the above-mentioned configuration.

Here, as the chroma demodulation system, a system is known which is designed so as to be decodable, corresponding to the inputs of not only the composite video signal through the particular one television system but also the composite video signals through a plurality of kinds of television systems. It is designed such that it can execute the decoding process, for example, corresponding to even the input of any composite video signal of various NTSC systems, PAL systems, and SECAM and the like.

So, the digital chroma demodulation system shown in FIG. 7 is explained under the assumption that it also employs the configuration corresponding to the multi-input of the above-mentioned composite video signal.

A system clock CLK is inputted to a digital chroma demodulation system 100 shown in FIG. 7. An A/D converter 101, a Y/C separation circuit 103 and a chroma demodulation circuit 104, which constitute the digital chroma demodulation system 100, are operated at the timing in accordance with this system clock CLK. Here, this system clock CLK is outputted from the PLL circuit included by the chroma demodulation circuit 104. This PLL circuit generates and outputs the system clock synchronized with the color burst signal by operating so as to be locked corresponding to the color burst signal of the input composite video signal. Then, the frequency of the system clock CLK in this case is assumed to be 4 fsc, as mentioned above.

For example, when the composite video signal of an NTSC system is inputted, since the frequency fsc of the color burst signal is 3.58 MHz, a system clock frequency is 14.32 MHz (=4×3.58 MHz). In addition, when the composite video signal of a PAL system is inputted, the frequency fsc of the color burst signal is 4.43 MHz. Thus, the system clock frequency is 17.72 MHz (=4×4.43 MHz).

The composite video signal which is to be inputted to the digital chroma demodulation system 100 is firstly inputted to the A/D converter 101. The A/D converter 101 performs the A/D conversion on the input composite video signal at the operation timing based on the system clock CLK of 4 sfc and outputs the digital composite video signal to a terminal T1 of a switch circuit 102 and the Y/C separation circuit 103.

The Y/C separation circuit 103 performs the operation as a comb-shaped filter formed as, for example, a digital circuit, on the input composite video signal, and consequently separates into the luminance signal (Y-signal) and the chroma signal (C-signal). The luminance signal is outputted to a terminal T2 of the switch circuit 102, and the chroma signal is outputted to the chroma demodulation circuit 104.

The chroma demodulation circuit 104 performs a decoding process on the input chroma signal through a digital signal process and outputs the color difference signals Cr and Cb.

The switch circuit 102 carries out the switching so that a terminal T3 is alternatively connected to the terminal T1 or terminal T2. In a normal case, the terminal T3 is connected to the terminal T2.

Consequently, the digital chroma demodulation system 100 outputs the luminance signal and the color difference signals Cr, Cb, which are extracted from the input composite video signal.

Here, the switch circuit 102 is included corresponding to the fact that the digital chroma demodulation system 100 shown in FIG. 7 is configured corresponding to the multi-input of the composite video signal.

In the case of corresponding to the multi-input of the composite video signal, there maybe a case that the television system of the input composite video signal to be inputted is switched, for example, from the NTSC system to the PAL system.

In this way, when the television system of the composite video signal to be inputted is switched and changed the frequency of the color burst signal or when the burst signal is not inserted into the composite video signal to be inputted, the digital chroma demodulation system 100 enters the determining operation for the television system.

The period while the determination of the television system is performed as mentioned above is at the situation that the system clock CLK complying with the input composite video signal can not yet be generated. Thus, since the Y/C separating and chroma demodulation processes can not be correctly performed, the luminance signal and the color difference signals Cr, Cb can not be outputted.

So, in the period while the determining operation for the television system is performed, in the switch circuit 102, the terminal T1 and the terminal T3 are connected. Consequently, instead of the luminance signal, the composite video signal (CVBS signal) after the A/D conversion is directly outputted to a video signal processing system at a later stage. Thus, for example, although a black and white image screen, an image display output based on a video signal can be kept.

Here, the determining operation for the television system as mentioned above is performed as follows in brief.

For example, in assuming that the composite video signal of the different television system from the previous television system or the composite video signal into which the color burst signal is not inserted is started to be inputted to the digital chroma demodulation system 100.

At the above-mentioned situation, on the digital chroma demodulation system 100 side, the frequency of the system clock is switched to the frequency (4 fsc) corresponding to the television system which is pre-assumed to be inputted every several times of a vertical scan period in order to determine the television system on which the input composite video signal is based.

For example, at first, 14.32 MHz that is the frequency of 4 fsc corresponding to the NTSC system is set for the frequency of the system clock CLK, and the digital chroma demodulation system 100 is operated. Due to this operation, as mentioned above, the PLL circuit included by the chroma demodulation circuit 104 detects whether or not it can be locked to the color burst signal. Here, if the composite video signal to be inputted is based on the NTSC system, the PLL circuit obtains the converging operation so that it is locked to the color burst signal, and determines that the composite video signal presently inputted is based on the NTSC system. Hereafter, on the basis of the system clock CLK of this 14.32 MHz, the digital chroma demodulation system 100 is operated.

On the contrary, even after the elapse of the vertical scan periods corresponding to several times, if the PLL circuit can not obtain the situation that it is locked to the color burst signal, next, for example, the frequency of the system clock is switched to 4 fsc=17.72 MHz corresponding to the PAL system. Similarly to the above-mentioned case, the PLL circuit detects whether or not it can be locked to the color burst signal, within the vertical scan periods corresponding to the several times.

Here, according to the explanation with reference to FIG. 7, in the period until the determining operation for the television system is finished, from the digital chroma demodulation system 100, the composite video signal converted into the digital signal by the A/D converter 101 is outputted directly through the switch circuit 102. Then, it becomes the situation that the image displaying through this composite video signal is being performed.

Then, at this time, as mentioned above, the switching of the system clock frequency based on the television system is performed. However, the system clock frequency that is 4 fsc is, for example, 14.32 MHz in the NTSC system, and 17.72 MHz in the PAL system. Namely, when the determining operation of the television system is actually being performed, even at least between the NTSC system and the PAL system, the system clock frequency is changed by 20% or more every each vertical scan periods corresponding to the several times.

Then, in response to the fact that the system clock frequency is greatly changed as mentioned above, for example, the sampling point, sampling frequency and the like in the A/D converter 101 are changed, which consequently brings about the change even in the image viewed by outputting the A/D-converted composite video signal for display.

More specifically, the appearance frequency characteristic is changed so as to be extended or dropped. In addition, the appearance of the moire portion caused by the returning of the portion of a high-frequency signal may be also changed. Then, the change in the image as mentioned above is frequently changed in the periods corresponding to each vertical scan periods corresponding to the several times. Thus, the displayed image becomes visually degraded.

The above-mentioned phenomenon becomes the serious problem in the case that, in particular, for example, the color burst signal is not inserted and the black and white composite video signal is inserted.

In other words, the determining operation for the television system as mentioned above is carried out by determining whether the color burst signal is in the locked state or not. Thus, if the color burst signal is not inserted as the black and white composite video signal, the switching of the system clock frequency is continuously repeated. Hence, in this case, the visually degraded image, which is frequently changed, is continuously displayed.

In this way, in the digital chroma demodulation system configured corresponding to the multi-input of the composite video signal, for example, the inevitable execution of the switching of the system clock frequency in association with the determining operation for the television system causes the disturbance in the display image when the system clock frequency is switched.

DISCLOSURE OF THE INVENTION

Accordingly, in the present invention, by considering the above-mentioned subjects, a video signal processing circuit is designed as follows.

In other words, the video signal processing circuit includes: analog/digital converting means, which is capable of inputting a composite video signal in which a color burst signal of system with different frequency, for converting an inputted composite video signal as an analog signal to a composite video signal as a digital signal by sampling with a sampling frequency in accordance with a system clock; video signal processing means for executing a YC separation process for separating a luminance signal and a chroma signal from the composite video signal as the digital signal, and a chroma demodulation process for demodulating the chroma signal obtained by the YC separation process, at a predetermined timing based on the system clock; and system clock generating means for generating the system clock synchronized with the color burst signal extracted from the composite video signal, and configured to change and set a coefficient n in accordance with a system of the composite video signal inputted to the video signal processing means so as that a frequency m falls in a predetermined range between the different systems, in a case where a frequency of the color burst signal is defined as fsc, a coefficient is defined as n, and a frequency m of the system clock is represented by fsc×n=m.

In addition, a video signal processing method is designed as follows.

In other words, the video signal processing method is designed so as to execute: an analog/digital converting process, which is capable of inputting a composite video signal in which a color burst signal of system with different frequency, for converting an inputted composite video signal as an analog signal to a composite video signal as a digital signal by sampling with a sampling frequency in accordance with a system clock; a video signal processing process for executing a YC separation operation for separating a luminance signal and a chroma signal from the composite video signal as the digital signal, and a chroma demodulation operation for demodulating the chroma signal obtained by the YC separation process, at a predetermined timing based on the system clock; and a system clock generating process for generating the system clock synchronized with the color burst signal extracted from the composite video signal, and configured to change and set a coefficient n in accordance with a system of the composite video signal inputted to the video signal processing means so as that a frequency m falls in a predetermined range between the different systems, in a case where a frequency of the color burst signal is defined as fsc, a coefficient is defined as n, and a frequency m of the system clock is represented by fsc×n=m.

In the above-mentioned configuration, at first, correspondingly to the multi-input of the composite video signal in which the type is different depending on the difference of the frequency of the color burst signal, the digital signal process for the chroma demodulation can be executed.

Then, under this configuration, the frequency of the system clock synchronized with the color burst signal for the chroma demodulation process is set as follows. Namely, when the system clock frequency m is represented by (m=fsc×n) (fsc is the frequency of the color burst signal, and n is the coefficient), by changing and setting the coefficient n corresponding to the type (color burst signal frequency fsc), the frequency m of the system clock between the types is tried to fall in a constant range. In other words, irrespectively of the type of the composite video signal, the frequency m of the system clock is set so as to be approximately equal.

Consequently, even if the composite video signal inputted as the target for the chroma demodulation process through the digital signal process is any type (in other words, any color burst signal frequency), it can be A/D-converted on the basis of the substantially constant sampling frequency. In addition, due to this reason, the sampling conditions, such as the sampling frequency, the sampling point and the like, are not largely changed between the component signals of the different types.

BRIEF DESCRIPTION OF THE DRAWINGS

FIG. 6 is an explanation view showing color burst signal frequencies fsc, 4 fsc and a system clock frequency, for each television system to which the digital chroma demodulation system of the embodiment corresponds.

BEST MODE FOR CARRYING OUT THE INVENTION

Figure 1:
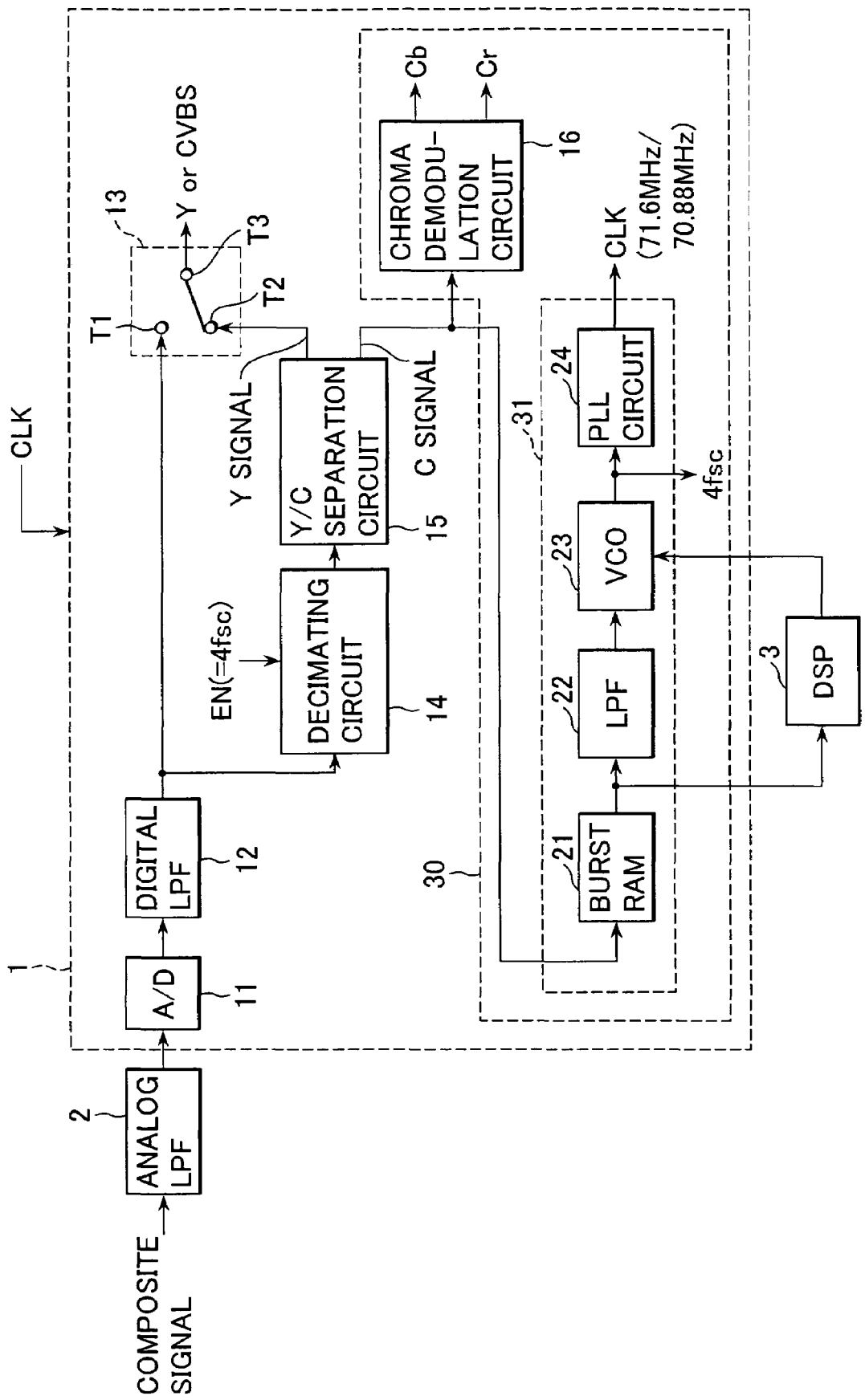
FIG. 1 is a block diagram showing a configuration example of a digital chroma demodulation system as an embodiment of the present invention.

A chroma demodulation system being as a video signal processing circuit as an embodiment of the present invention will be described below.

The chroma demodulation system of this embodiment is included by, for example, a television receiver and a monitor apparatus, and this is designed such that as a demodulation process for a composite video signal, a Y/C separation process and a chroma demodulation process are executed by a digital signal process so that a luminance signal and color difference signal as a digital signal are consequently outputted.

In addition, the chroma demodulation system in this embodiment corresponds to the multi-input of the composite video signal. In other words, this is designed such that it can execute the demodulation process (the Y/C separation process and the chroma demodulation process) of the composite video signal, corresponding to the input of the composite video signal of a different television system.

Hereinafter, the explanation will be given in the following order.

1. System Clock Frequency
2. Configuration of Digital Chroma Demodulation system
3. Configuration Corresponding to Multi-Input of Component Signal 1. System Clock Frequency Here, in the digital chroma demodulation system configured to correspond to the multi-input of the composite video signal previously described in the prior art, it is said that the disturbance in the image caused by the switching of the system clock frequency in association with the determining operation for the television system results from the following factors.

In other words, the deviations of the sampling point and sampling frequency at the time of the A/D conversion, on the basis of the frequency difference of the system clock between the television systems is enlarged to a degree that it can be visually recognized as the disturbance in the image.

Accordingly, it will be sufficient to set the system clock frequency corresponding to each television system, in such a way that the deviations of the sampling point and sampling frequency at the time of the A/D conversion is reduced to the degree that the disturbance in the image can not be visually recognized.

In other words, namely, this implies that so as to make the deviation amounts of the sampling point and sampling frequency at the time of the A/D conversion fall in a necessary range, as for the system clock frequency for each television system, even its frequency difference may be set to be in the predetermined range.

The setting of the system clock frequency for each television system as mentioned above will be considered below with reference to FIG. 6.

Here, as the television system of the composite video signal to which the digital chroma demodulation system of this embodiment should correspond, for example, as shown in FIG. 6, it is assumed that there are seven kinds of NTSC, NTSC-443, PAL, PAL-M, PAL-N, PAL-60 and SECAM.

Then, it is found that the frequency fsc of the color burst signal corresponding to each of those television systems belongs to any group of 3.58 MHz and 4.43 MHz. Then, as the digital chroma demodulation system, the output from the PLL circuit locked to the frequency fsc of this color burst signal is used as the system clock synchronized with the color burst signal. Thus, the system clock needs to be the multiple of the frequency fsc.

So, as the system clock frequency, when predetermined multiplications are performed on the color burst signals fsc=3.58 MHz and fsc=4.43 MHz, respectively, and compared them. The result shown in FIG. 6 is obtained in the case that both of the frequencies fall in the above-mentioned predtermined range.

In other words, as the system clock frequency, as for the color burst signal frequency fsc=3.58 MHz, the fsc is multiplied by 20 and increased to 71.6 MHz (=20 fsc), as for the color burst signal frequency fsc=4.43 MHz, the fsc is multiplied by 16 and increased to 70.88 MHz (=16 fsc). In this case, the difference between both the frequencies is 0.72 MHz, and the mutual change rate is about 1%.

In this case, as the system clock frequencies for both, for example, when the composite video signal after the A/D conversion is outputted as the image, in the case of comparing with the degree of the disturbance in the image, they are about 71 MHz and may be regarded to be substantially constant.

The system clock frequency of the related art (=4 fsc) is also shown in FIG. 6 as the comparison, it is 14.32 MHz in the case of fsc=3.58 MHz and 17.72 MHz in the case of fsc=4.43 MHz. Its difference is 3.4 MHz, which exhibits the change rate of about 20%. That is, it has the frequency difference larger than the case of this embodiment. In other words, it is said that the frequency difference of the system clock in this embodiment is very small.

In addition, the system clock frequencies in this embodiment set as mentioned above are 71.6 MHz=20 fsc and 70.88 MHz=16 fsc. However, they may be represented by:

20 fsc=5×4 fsc 16 fsc=4×4 fsc

Any of them can be obtained by multiplying 4 fsc by an integer. Consequently, the process such as the chroma demodulation in a digital chroma demodulation system 1 in this embodiment, which will be described later, is designed so as to be able to also employ an existing circuit operatable at the clock of 4 fsc.

2. Configuration of Digital Chroma Demodulation System

In succession, the digital chroma demodulation system in this embodiment which is designed so as to be operated at the system clock of about 71 MHz (71.6 MHz or 70.88 MHz) set as mentioned above, is firstly explained with reference to FIG. 1.

The digital chroma demodulation system 1 shown in this FIG. 1 employs the configuration corresponding to the input of the composite video signals of the various television systems, for example, as shown in FIG. 6.

Although the composite video signal as an analog signal is inputted to the digital chroma demodulation system 1, this composite video signal is actually inputted to an analog LPF (Low Pass Filter) 2 placed at the previous stage of the digital chroma demodulation system 1.

Here, the digital chroma demodulation system 1 is operated on the basis of a system clock CLK of about 71 MHz (71.6 MHz or 70.88 MHz), and a sampling frequency of an A/D converter 11, which will be described later, is about 71 MHz. For this reason, the frequency band of an analog composite video signal to be inputted needs to be in the range of a Nyquist frequency of about 35 MHz which is approximately half of 71 MHz. The analog LPF 2 is provided in order to eliminate the high frequency component so that the analog composite video signal falls in the frequency band of about 35 MHz or less. For this reason, the proper value close to 35 MHz is set as the cutoff frequency of the analog LPF 2.

The analog composite video signal passed through the analog LPF 2 is inputted to the A/D converter 11 of the digital chroma demodulation system 1, and converted into the digital signal on the basis of the sampling frequency of about 71 MHz (71.6 MHz or 70.88 MHz) as mentioned above, and then outputted to a digital LPF 12 at a later stage.

About 7 MHz as the cutoff frequency corresponding to the luminance signal contained in the composite video signal is set and the digital LPF 12 eliminates the band component falling in the higher frequency than the band as the luminance signal from the composite video signal, and passes the resulted signal. Consequently, a Y/C separation process is properly executed by a Y/C separation circuit 15, which will be described later.

The composite video signal passed through the digital LPF 12 is branched and inputted to a terminal T1 of a switch circuit 13 and to a decimating circuit 14.

Here, the Y/C separation process performed by the Y/C separation circuit 15 and a chroma demodulation process performed by a chroma demodulation circuit 16, which will be described later, are not operated on the basis of the system clock CLK of 71.6 MHz (=20 fsc) corresponding to a color burst signal frequency fsc=3.58 MHz or 70.88 MHz (=16 fsc) corresponding to a color burst signal frequency fsc=4.43 MHz, but they are configured so as to be operated on the basis of a clock of 4 fsc.

Figure 7:
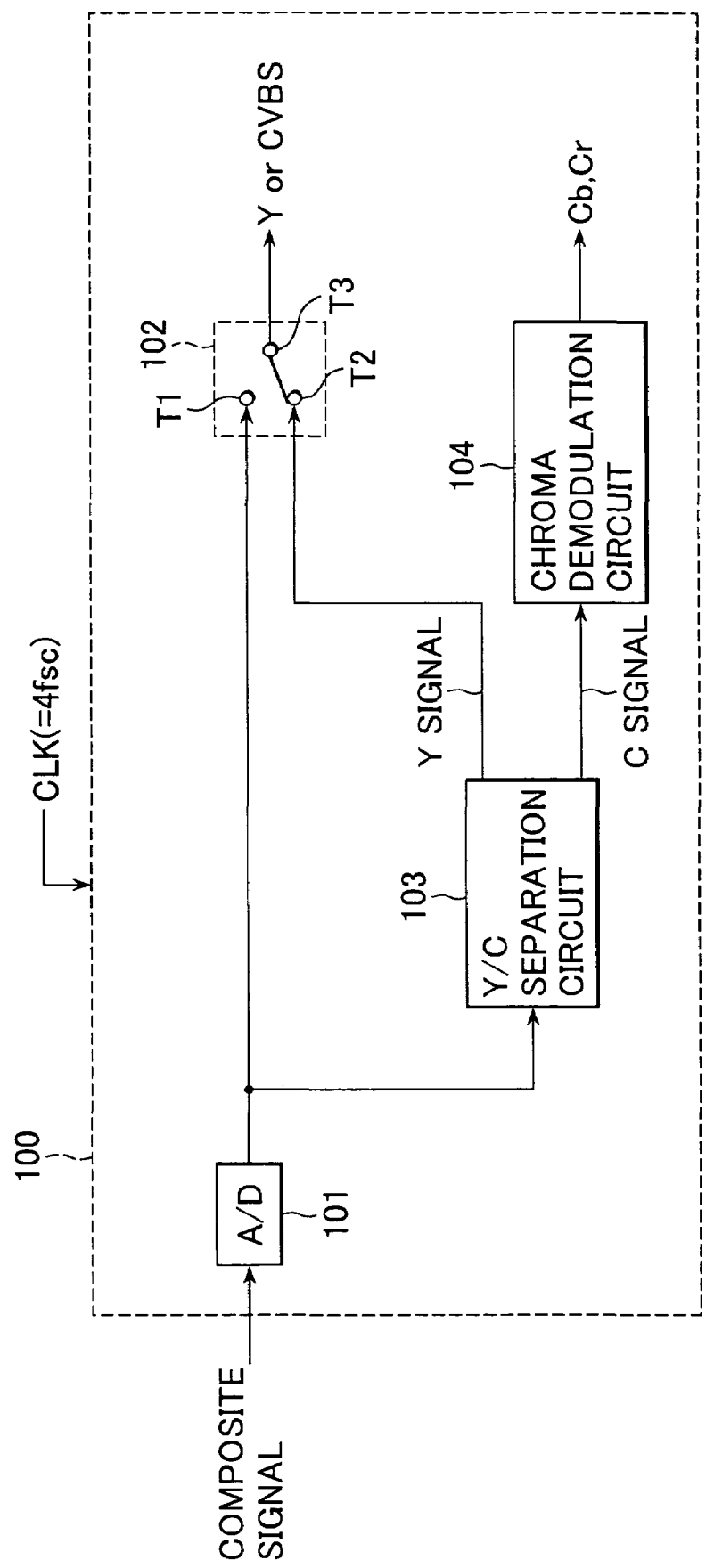
FIG. 7 is a block diagram showing a configuration example of a digital chroma demodulation system as a conventional example.

In other words, as explained in FIG. 7, conventionally, the Y/C separation process and the chroma demodulation process are executed on the basis of the system clock of 4 fsc. As for those Y/C separation circuit 15 and chroma demodulation circuit 16, this embodiment uses the type which is operated on the basis of the system clock of 4 fsc for utilizing the existing techniques of the Y/C separation process and chroma demodulation process. Thus, since the main hardware does not require the configuration corresponding to a new system clock frequency, the cost increase corresponding thereto can be avoided.

However, the composite video signal is sampled on the basis of the sampling frequency of about 71 MHz (71.6 MHz or 70.88 MHz) which is the system clock CLK. Thus, the matching with regard to the sampling frequency is needed at the previous stage of the Y/C separation process, so as to comply with the Y/C separation process and chroma demodulation process on the basis of the clock of 4 fsc.

The decimating circuit 14 is provided in order to carry out the matching with regard to the sampling frequency as mentioned above, by performing the sampling through the decimate at a predetermined interval, on the sampling data as the composite video signal after the A/D conversion.

Here, as for the system clock CLK, although 71.6 MHz corresponding to the color burst signal frequency fsc=3.58 MHz is 20 fsc, 70.88 MHz corresponding to the color burst signal frequency fsc=4.43 MHz is 16 fsc, and the multiples to the color burst signal frequencies fsc are different from each other. For this reason, the decimating circuit 14 switches its operation between the case of fsc=3.58 MHz and the case of fsc=4.43 MHz, with regard to the color burst signal frequency of the input composite video signal.

At first, with regard to the color burst signal frequency fsc of the input composite video signal, the operation of the decimating circuit 14 in the case of fsc=3.85 MHz will be described below with reference to FIG. 2.

In this case, the frequency of the system clock CLK is 71.6 MHz (=20 fsc) after fsc=3.58 MHz is multiplied by 20. Then, in the A/D sample data (CV0 to CV15 . . . ) of the composite video signal digitized by the A/D converter 11 on the basis of the sampling frequency based on this system clock CLK, one sample corresponds to each cycle of the system clock CLK, as shown in FIG. 2.

Here, the clock of 4 fsc is inputted, as an enable signal EN generating a sampling timing, is inputted to the decimating circuit 14. The clock of 4 fsc in this case becomes 4×3.58 MHz=14.32 MHz.

Then, this 4 fsc clock can be obtained by dividing the system clock CLK into ⅕, for example, by using a divider, which is not shown here. Or, since an oscillation signal outputted from a VCO 23 which will be described later is 4 fsc, this signal may be used as the clock.

Here, when the system clock CLK of 20 fsc (=71.6 MHz) and the enable signal EN of 4 fsc (=14.32 MHz) are compared, the enable signal EN has the cycle of ⅕ of the color burst signal, as represented by:

20 fsc/4 fsc=5

The decimating circuit 14 executes the sampling at the rising timing of this enable signal EN. This implies that the ⅕ decimate process is performed on the A/D sample data (CV0 to CV15 . . . ).

In other words, for example, it is assumed that the A/D sample data CV0 is sampled at the rising timing of the enable signal EN at a time t1. Then, at a time t2 which is the rising timing of a next enable signal EN, the fifth A/D sample data CV5 from the A/D sample data CV0 is sampled. Hereafter, similarly, at a time t3 which is the rising timing of a next enable signal EN, the further fifth A/D sample data CV10 from the A/D sample data CV5 is sampled. Then, at a time t4 which is the rising timing of a next enable signal EN, the fifth A/D sample data CV15 from the A/D sample data CV10 is sampled.

Figure 2:
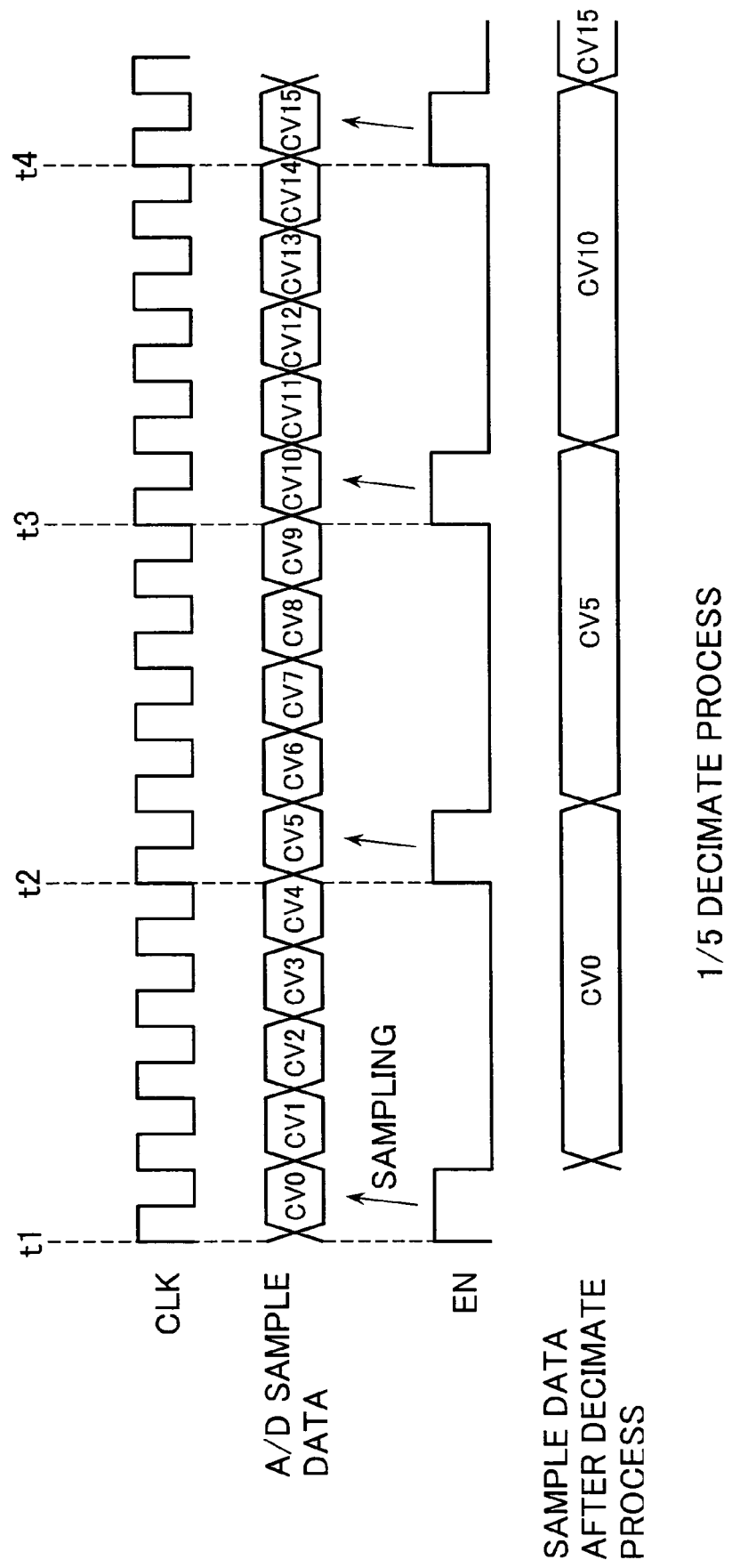
FIG. 2 is a timing chart showing a ⅕ decimate process of a composite video signal, which is executed in the digital chroma demodulation system in the embodiment.

Due to the above-mentioned sample operation, as shown in FIG. 2, as the sample data row after the decimate process, it is obtained by decimating the sample data, every five data, from the original A/D sample data row, like the sample data CV0, CV5, CV10, CV15 . . . . In other words, the ⅕ decimate process is performed on the original A/D sample data. Then, the sample data obtained after the decimate process in this way is equivalent to those sampled on the basis of the sampling frequency of 4 fsc.

Figure 3:
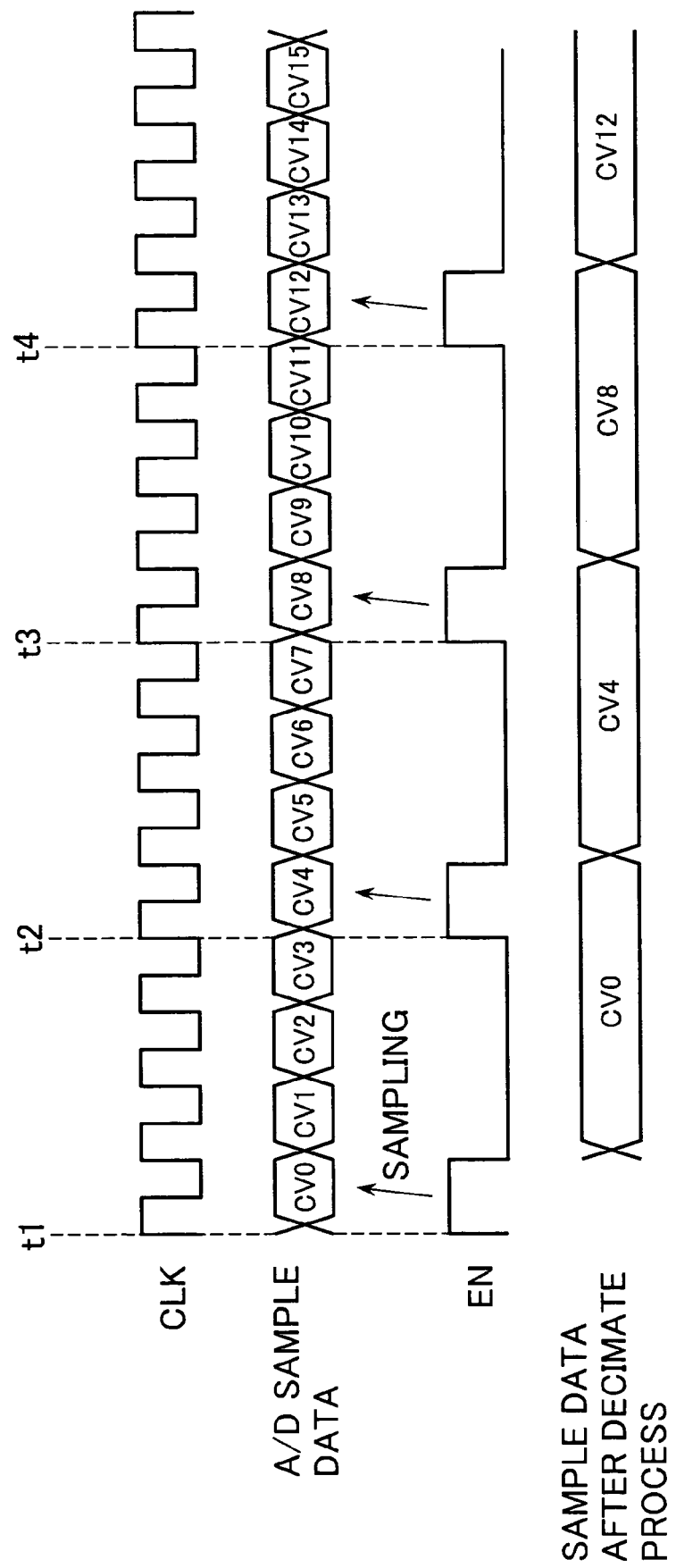
FIG. 3 is a timing chart showing a ¼ decimate process of a composite video signal, which is executed in the digital chroma demodulation system in the embodiment.

In succession, the operation of the decimating circuit 14 when the color burst signal frequency fsc of the composite video signal to be inputted is fsc=4.43 MHz is explained with reference to FIG. 3.

In this case, 71.6 MHz (=20 fsc) which is the frequency of the system clock CLK is obtained by multiplying fsc=4.43 MHz by 16. Then, for this case, the A/D sample data (CV0 to CV15 . . . ) of the composite video signal digitized by the A/D converter 11 are sampled on the basis of the sampling frequency based on the system clock CLK. Thus, as shown in FIG. 3, one sample corresponds to each cycle of the system clock CLK.

As mentioned above, the enable signal EN inputted to the decimating circuit 14 has the clock of 4 fsc. Then, in this case, 4 fsc=4×4.43 MHz=17.72 MHz.

Then, in this case, when the system clock CLK of 16 fsc (=71.6 MHz) and the enable signal EN of 4 fsc (=14.32 MHz) are compared, the enable signal EN has the cycle of ¼ of the system clock CL, as represented by:

4 fsc/16 fsc=¼

Thus, since the decimating circuit 14 executes the sampling at the rising timing of this enable signal EN, the ¼ decimate process is performed on the A/D sample data (CV0 to CV15 . . . ).

In other words, for example, it is assumed that the A/D sample data CV0 is sampled at the rising timing of the enable signal EN at a time t1. Then, at a time t2 which is the rising timing of a next enable signal EN, the fourth A/D sample data CV4 from the A/D sample data CV0 is sampled. Hereafter, similarly, at a time t3 which is the rising timing of a next enable signal EN, the further fourth A/D sample data CV8 from the A/D sample data CV4 is sampled. Then, at a time t4 which is the rising timing of a next enable signal EN, the fourth A/D sample data CV12 from the A/D sample data CV8 is sampled.

In this way, as the sample data row after the decimate process, it is obtained by decimating the sample data, every four data, from the original A/D sample data row, like the sample data CV0, CV4, CV8, CV12 . . . . Then, even in this case, the sample data after the decimate process is equivalent to those sampled on the basis of the sampling frequency of 4 fsc.

The explanation is returned back to FIG. 1.

The composite video signal (sampling data), which is obtained in the decimating circuit 14 and sampled on the basis of the sampling frequency of 4 fsc, as mentioned above, is inputted to the Y/C separation circuit 15.

The Y/C separation circuit 15 performs the Y/C separation process on the input composite video signal, at the timing based on the clock of 4 fsc, as mentioned above, and outputs the luminance signal (Y-signal) and the chroma signal (C-signal).

The luminance signal is outputted to the terminal T1 of the switch circuit 13. The chroma signal is outputted to the chroma demodulation circuit 16 in a chroma demodulation block 30. This chroma signal is also outputted to a burst RAM 21.

The chroma demodulation block 30 has the chroma demodulation circuit 16 and a PLL block 31, as shown in FIG. 1.

The chroma demodulation circuit 16 performs the demodulation process on the input chroma signal, at the timing based on the clock of 4 fsc. Thus, here, it generates and outputs the color difference signals Cb, Cr.

In addition, the PLL block 31 is formed with the burst RAM 21, an LPF 22, the VCO 23 and a PLL circuit 24, and constitutes so-called APC (Auto Phase Control) in which it is locked to the color burst signal contained in the chroma signal, as the operation of the PLL circuit system.

Here, as for the frequency of the system clock CLK in this embodiment, as mentioned above, it is 20 fsc=71.6 MHz corresponding to the color burst signal frequency fsc=3.58 MHz, and 16 fsc=71.6 MHz corresponding to fsc=4.44 MHz. However, any of them can be obtained by multiplying 4 fsc by the integer (×5 or ×4).

Thus, as mentioned above, the Y/C separation circuit 15, the chroma demodulation circuit 16 and the like, which are operated on the basis of the clock of 4 fsc, can be easily operated on the basis of the system clock CLK of this embodiment.

In other words, practically, when the system clock CLK is 20 fsc=71.6 MHz, for example, the clock of 4 fsc can be obtained by performing the ⅕ division using the divider and the like. Moreover, when the system clock CLK is 16 fsc=71.6 MHz, the clock of 4 fsc can be obtained by performing the ¼ division. In this way, since the system clock CLK is to be the integer multiple of 4 fsc, the configuration of the signal process based on 4 fsc can be employed without any special problem.

The burst RAM 21 stores the color burst signal as the sample data sampled on the basis of the inputted sampling frequency of 4 fsc. The thus-stored sample data has the phase information of the color burst signal.

Then, the band is limited so as to enable the stable phase detection by passing the sample data as this color burst signal through the LPF 22 on the basis of a predetermined cutoff frequency, and it is inputted to the VCO 23. Consequently, the VCO 23 is operated so as to output the oscillation signal with a frequency synchronized with the frequency of the color burst signal. Incidentally, the oscillation frequency outputted from the VCO 23 is set at 4 fsc here, however, if it is synchronized with the frequency of the color burst signal, it is not necessary to be 4 fsc.

However, as can be understood from the above explanations, the clock of 4 fsc is used for the enable signal EN of the decimating circuit 14 and further used in the Y/C separation process and the chroma demodulation process. Thus, with regard to this point, when the oscillation frequency of the VCO 23 is assumed to be 4 fsc, the oscillation signal can be preferably used in its original state as the clock.

The oscillation signal of 4 fsc outputted from the VCO 23 is inputted to the PLL circuit 24. The PLL circuit 24 is operated so as to lock the oscillation signal of 4 fsc which is inputted from the VCO 23, and consequently generates and outputs the system clock CLK synchronized with the color burst signal.

Here, the frequency of the oscillation signal inputted to the PLL circuit 24 is generated on the basis of the color burst signal component of the composite video signal which is ⅕ decimated or ¼ decimated by the decimating circuit 14.

Consequently, corresponding to the case in which, under the assumption that the color burst signal frequency of the composite video signal to be inputted is fsc=3.58 MHz, the decimating circuit 14 executes the ⅕ decimate process, so as to multiply the oscillation signal of 4 fsc inputted from the VCO 23 by 5, the system clock CLK of 20 fsc=71.6 MHz is generated.

In addition, corresponding to the case in which, under the assumption that the color burst signal frequency of the composite video signal to be inputted is fsc=4.43 MHz, the decimating circuit 14 executes the ¼ decimate process, so as to multiply the oscillation signal of 4 fsc inputted from the VCO 23 by 4, the system clock CLK of 16 fsc=70.88 MHz is generated.

In this way, the digital chroma demodulation system 1 in this embodiment is designed such that the decimate operation in the decimating circuit 14 and the multiple of the oscillation signal of 4 fsc in the PLL circuit 24 are switched in linkage.

Then, the digital chroma demodulation system 1, which can correspond to the multi-input of the composite video signal by having the above-mentioned configuration, executes the determining operation (color determination) for the television system, in the case of switching to the input of the composite video signal in which the color burst signal frequency fsc is different, such as the case that the television system of the input composite video signal is switched, for example, between the NTSC system and the PAL system.

In addition, for example, even in the case of switching from the composite video signal (color video signal) into which the color burst signal is usually inserted to the input of the black and white video signal into which the color burst signal is not inserted, the operation for determining the television system is executed. In other words, if the conditions such as the presence or absence of the color burst signal in the composite video signal to be inputted or the frequency is changed, the synchronization between the system clock CLK and the color burst signal is not obtained. In such case, the television system of the composite video signal to be inputted is regarded to be changed, and it proceeds to the determining operation for the television system.

The determining operation for the television system is executed, for example, as follows.

A DSP (Digital Signal Processor) 3 shown in FIG. 1 can recognize, for example, whether or not the PLL circuit 24 is at the locked state. Then, when the DSP 3 recognizes that the PLL circuit 24 becomes at the unlocked state in response to the switching of the composite video signal to be inputted, it starts the determining operation for the television system.

Then, as the determining operation for the television system, the DSP 3 controls to switch the oscillation signal frequency as 4 fsc outputted from the VCO 23, for every scan period corresponding to the several vertical scan periods. Here, the frequency of the oscillation signal of the VCO 23 to be switched for each scan period is 4 fsc corresponding to the color burst signal of the television system to which the digital chroma demodulation system 1 should correspond.

The PLL circuit 24 is operated so as to input the oscillation signal of 4 fsc from this VCO 23 and to lock synchronously with the sample data of the color burst signal to be inputted to the burst RAM 21.

Incidentally, in this embodiment, practically,the television systems correspond to the 7 systems, also as shown in FIG. 6. However, as the color burst signals inserted into the composite video signals in those 7 television systems, there are only two kinds of fsc=3.58 MHz and 4.43 MHz. Thus, as the oscillation signals of 4 fsc, there also are two kinds of 14.32 MHz (=4×3.58 MHz) and 17.72 MHz (=4×4.43 MHz). Thus, the DSP 3 actually executes the control the VCO 23 in such a way that the oscillation signals of 4 fsc=14.32 MHz and 4 fsc=17.72 MHz are outputted for each scan period.

Here, for example, it is assumed that under the control of the DSP 3, at first, the VCO 23 outputs the oscillation signal of 4 fsc=14.32 MHz within one scan period. At this time, if the frequency of the color burst signal of the input composite video signal is fsc=3.58 MHz, the PLL circuit 24 is locked at the situation of outputting the system clock CLK of 71.6 MHz, and not locked other than fsc=3.58 MHz (for example, fsc=4.43 MHz).

Actually, if the PLL circuit 24 is locked within this one scan period, hereafter, the output of the oscillation signal of 4 fsc=14.32 MHz from the VCO 23 is fixed, which consequently continues the operation of the digital chroma demodulation system 1 based on the system clock CLK of 71.6 MHz.

On the contrary, if the PLL circuit 24 is not locked within the one scan period when the VCO 23 outputs the oscillation signal of 4 fsc=14.32 MHz, the DSP 3 switches the oscillation signal of 4 fsc to be outputted from the VCO 23, from 14.32 MHz to 17.72 MHz. Under this condition, similarly to the above, it is determined whether or not the PLL circuit 24 becomes at the locked state.

In this way, as for the determination of the television system, the switching of the clock frequency is carried out for each scan period, and the scan operation is carried out for determining whether or not the PLL circuit 24 is locked to the color burst signal of the composite video signal to be inputted. Then, until the PLL circuit 24 is locked, such operation is repeatedly executed.

Then, due to the above-mentioned scan operation, the digital chroma demodulation system 1 is operated on the basis of the system clock CLK complying with the television system of the composite video signal. Then, more specifically, the determination of the television system is executed as follows for example. Here, for the simple explanation, the case in which the determination is carried out between the NTSC system and the PAL system, as the television system, is taken as an example.

In the state that the composite video signal of the NTSC system is inputted and the PLL circuit 24 is locked, for example, due to the sampling through the clock of 4 fsc in the decimating circuit 14, for example, the sample data of R-Y component has a value close to 0.

On the contrary, if the sampling based on the clock of 4 fsc is performed on the composite video signal of the PAL system, the PLL circuit 24 is locked at the state that the phase is shifted by 90° with respect to the NTSC case. For this reason, the sample data of the R-Y component in the case of the PAL system has the value close to the maximum amplitude value of the color burst signal. In addition, in the PAL system, the phase of the chroma signal is inverted for each horizontal scan period. Thus, the amplitude value as the sample data in the R-Y component is also inverted with regard to the positive/negative value every horizontal scan period.

Subsequently, the DSP 3 refers to the sample data of the color burst signal every horizontal scan period (1H) inputted to the burst RAM 21. Then, for example, if the integrated value of the sample data of the R-Y component in each horizontal scan period is 0, it is determined to be the NTSC system.

On the contrary, if it is inverted such that the integrated value of the sample data of the R-Y component in a certain horizontal scan period is −A (A indicates the actual integrated value) and the integrated value of the sample data of the R-Y component in a next horizontal scan period is +A (A indicates the actual integrated value), it is determined to be the PAL system.

However, there may be a case that an error occurs in the actual frequency fsc of the color burst signal in the composite video signal to be inputted. In such a case, for example, the sample data of the R-Y component in the NTSC system does not become accurately 0, and it has a certain value other than this. In addition, the sample data of the R-Y component in the PAL system has a value different from the properly value.

However, the error of the sample data of the R-Y component as mentioned above becomes same at every horizontal scan period, in the case of the NTSC system. Thus, the error value of the sample data of the R-Y component for each horizontal scan period becomes constant, for example, such as 0+α (α is the value corresponding to the error). Therefore, when the difference between the integrated values of the sample data of the respective R-Y components in the previous and present horizontal scan periods is calculated, if it is 0, this may be determined to be the NTSC system.

On the contrary, in the PAL system, the error value of the sample data of the R-Y component is −A−β and +A+β (β is the value corresponding to the error) for every horizontal scan period. Thus, it is −A−β or +A+β every other horizontal scan period, and it is approximately constant. Therefore, when the difference between the integrated values of the sample data of the respective R-Y components in the previous and present horizontal scan periods is calculated, if the calculated value is the value other than 0 and the positive/negative values are reverse between the previous and present horizontal scan periods, this can be determined to be the PAL system.

In other words, even if the error occurs in the color burst signal frequency fsc, the determination of the television system can be carried out at the high precision.

Here, in the digital chroma demodulation system 1 shown in FIG. 1, at the usual time that the PLL circuit 24 is locked, the Y/C separation process and the chroma demodulation process are properly executed by the Y/C separation circuit 15, the chroma demodulation circuit 16 and the like. It is at the state that the normal luminance signal and color difference signals Cb, Cr are obtained.

At such a time, to the switch circuit 13, the terminal T2 and the terminal T3 are connected. Consequently, the luminance signal obtained by properly performing the Y/C separation process on the input composite video signal is outputted from the terminal T3. Then, together with the color difference signals Cb, Cr outputted from the chroma demodulation circuit 16, the image is properly displayed.

On the contrary, for example, at the time of the mode of executing the determining operation for the television system, as can be understood from the above-mentioned explanation, the PLL circuit 24 is not locked, which leads to the state that the system clock CLK synchronized with the color burst signal is not obtained. For this reason, the digital chroma demodulation system 1 can not properly execute the Y/C separation process, the chroma demodulation process and the like. In other words, since the normal luminance signal and color difference signal cannot be outputted, those signals can not be used to display and output the normal color image.

Therefore, when the determining operation for the television system is executed, the switch circuit 13 is switched such that the terminal T1 and the terminal T3 are connected.

Consequently, the digital chroma demodulation system 1 outputs the digitized composite video signal (CVBS signal) through the A/D converter 11→the digital LPF 12, and this composite video signal enables the continuation of the image displaying.

From the above, the digital chroma demodulation system 1 carries out the operation for switching the frequency (namely, the oscillation signal frequency of 4 fsc from the VCO 23) of the system clock CLK, as explained above, under the state that the composite video signal is directly outputted, during the determining operation for the television system.

The above-mentioned operation is executed even by the conventional digital chroma demodulation system corresponding to the multi-input. However, conventionally, since the frequency of the system clock CLK is defined as 4 fsc, the frequency difference of 4 fsc to be switched is large. For this reason, each time the frequency of the system clock CLK is switched, it is changed to the degree that the change in frequency characteristic, the condition of the moire of the retuned signal and the like can be visually recognized. This is because the sampling frequency when the composite video signal is A/D converted, the sampling point and the like are largely deviated, on the basis of the frequency difference of the system clock CLK, as mentioned above.

Then, such problem is very remarkable in the case of the input of the black and white video signal in which the color burst signal is not inserted into the signal of the composite type. In other words, because of the mechanism of the determining operation for the television system, in the case of the input of the black and white video signal, the non-existence of the color burst signal causes the continuous execution of the frequency switching operation as the determining operation for the television system. In such a case, conventionally, the change in the image as mentioned above is frequently occurred, for example, for each time corresponding to the several vertical scan periods, which causes the degraded image to be continuously displayed.

On the contrary, in the digital chroma demodulation system 1 of this embodiment, as explained above, the system clock CLK is concretely 71.6 MHz (=20 fsc) corresponding to the color burst signal frequency fsc=3.58 MHz, and is 70.88 MHz (=16 fsc) corresponding to the color burst signal frequency fsc=4.43 MHz. As a result, the frequency difference as the mutual system clocks CLK falls in the constant range.

For this reason, when the switching of the system clock CLK in association with the determining operation for the television system is performed, the deviations in the sampling frequency, sampling point and the like at the A/D converter 11 are reduced as compared with the conventional case.

As a result, in this embodiment, due to the composite video signal that is outputted from the digital chroma demodulation system 1 during the determining operation for the television system, as the image which is actually displayed and outputted, the disturbance caused by the switching of the frequency of the system clock CLK is suppressed to the degree that is hardly visually recognized.

In addition, as the determining operation for the television system of the digital chroma demodulation system 1 in this embodiment, when the black and white video signal is inputted, the switching operation for the system clock CLK is continuously executed. However, in this embodiment, even in such a case, the disturbance in the displayed image resulting from the switching of the frequency of the system clock CLK is hardly occurred, the images becomes very easily viewable.

In addition, since the frequency difference of the system clock CLK corresponding to each television system is small, the digital chroma demodulation system 1 in this embodiment has the following advantages.

As explained in FIG. 1, the digital chroma demodulation system 1 includes the digital LPF 12 for conforming the composite video signal after the A/D conversion to the band of the luminance signal.

Here, the cutoff frequency of a digital filter is changed in proportion to the frequency of the clock because of its configuration. Thus, for example, similarly to the conventional case, since the frequency of the system clock CLK is set at 4 fsc, if the frequency difference of the system clock CLK for every television system is large, the cutoff frequency of this digital LPF is largely changed for each television system. For this reason, practically, it is necessary to employ the mechanism such that a dedicated digital LPF corresponding to each frequency of the system clock CLK to be switched is provided, and the digital LPF to be used is switched every time the frequency of the system clock CLK is switched. In this case, employing such mechanism is making the circuit scale larger, which leads to, for example, the cost increase corresponding thereto.

On the contrary, in this embodiment, the frequencies of the system clocks CLK corresponding to the respective television systems are very close in the vicinity of 71 MHz. Thus, even if the frequency of the system clock CLK is switched, the change in the cutoff frequency in the digital LPF 12 is small level and there is no influence on the actual usage. Therefore, in this embodiment, as for even the inner digital filter and the like, it is possible to make one element to be used as commonly with respect to the composite video signals of the different television systems.

3. Configuration Corresponding to Multi-Input of Composite Video Signal

Meanwhile, as the video signal other than the composite video signal, for example, a component signal is also known. Accordingly, in the digital chroma demodulation system, it is possible to consider the configuration to which the function for processing not only the composite video signal but also the component signal is added.

Figure 4:
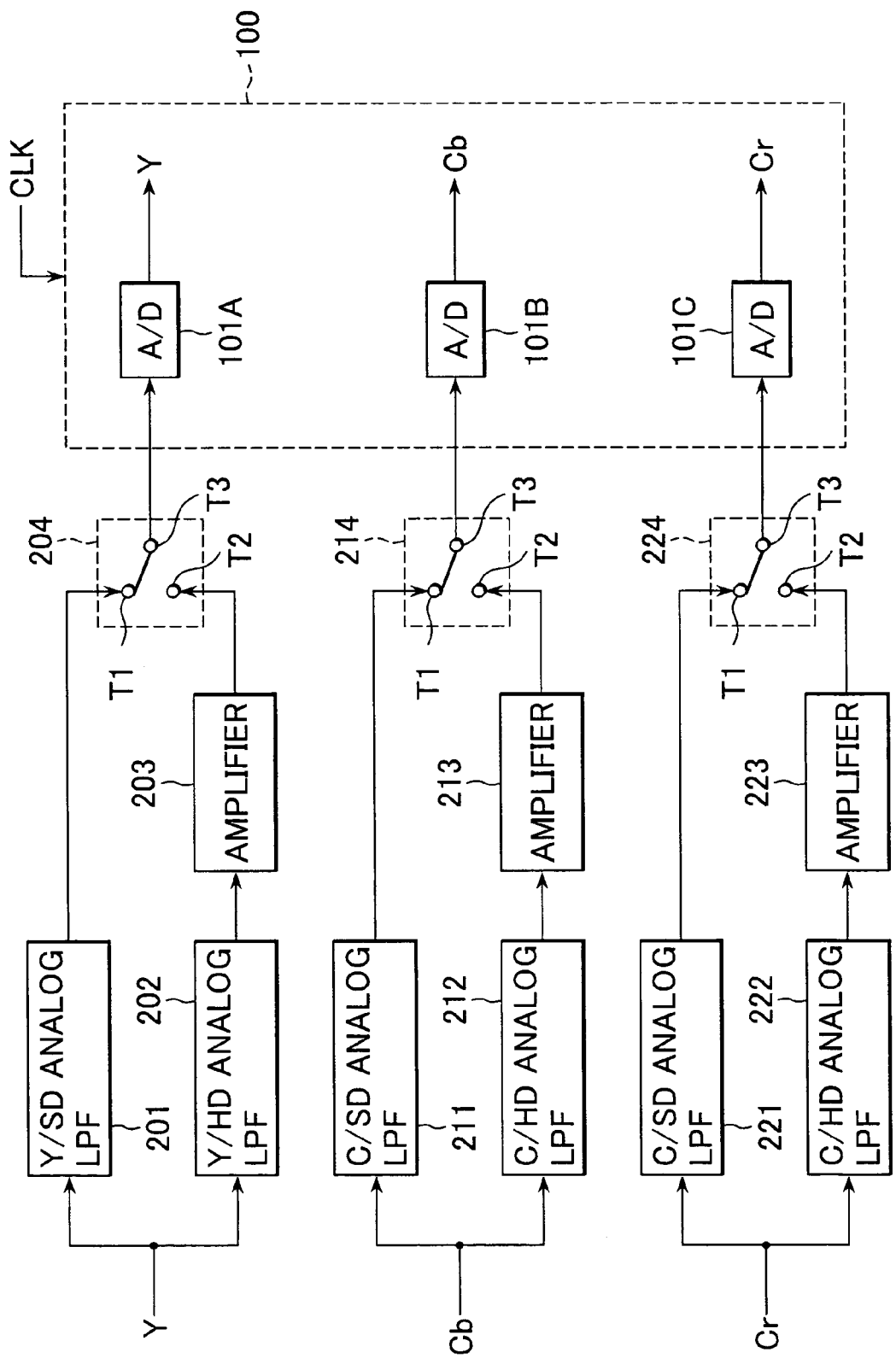
FIG. 4 is a block diagram showing a configuration example in a case of corresponding to an input of a composite video signal, in accordance with a configuration of a digital chroma demodulation system in which a system clock is 4 fsc.

Consequently, at first, a configuration example in which the function for processing a component signal is added to the digital chroma demodulation system 100 previously shown in FIG. 7 as the conventional example is shown in FIG. 4. Incidentally, in the digital chroma demodulation system 100 shown in FIG. 4, the illustration of the circuit configuration for the chroma demodulation targeted for the composite video signal shown in FIG. 7 is omitted, and only the portions with regard to the process of the composite video signal are picked up and indicated.

For example, practically, the component signal treated by the system shown in FIG. 4 is between 480i and 720p. In this case, for example, when the luminance signal (Y-signal) is taken as an example, as the kinds of dot clock frequencies (sampling frequencies), there are three kinds such as 13.5 MHz, 27 MHz and 74.25 MHz. For this reason, in order to carry out the sampling for the A/D conversion corresponding to those three kinds of the dot clock frequencies, the analog LPF for making the signal band fall in the range of the Nyquist frequency is required corresponding to each of the three kinds of the dot clock frequencies at the previous stage of the A/D converter. However, practically, instead of the 27 MHz sampling of 480p, it is configured to carry out the sampling at 72 MHz, which enables the analog LPF corresponding to the dot clock frequency 74.25 MHz to be used in corresponding to 480p. Consequently, as the analog LPF provided at the previous stage of the A/D converter, the two analog LPFs corresponding to the dot clock frequencies of 13.5 MHz and 74.25 MHz may be provided.

For this reason, the system shown in FIG. 4 employs the configuration of including the two analog LPF, for each of the luminance signal (Y-signal), the color difference signal Cb and the color difference signal Cr as the input component signal, at the previous stage of the A/D converter.

At first, the analog luminance signal is branched and inputted to a Y/SD analog LPF 201 and a Y/HD analog LPF 202.

The Y/SD analog LPF 201 is the analog LPF corresponding to the luminance signal as SD (Standard Definition) having a dot clock of 13.5 MHz, and the cutoff frequency is about 7 MHz.

The Y/HD analog LPF 202 is the analog LPF corresponding to the luminance signal as HD (High Definition) having a dot clock of 74.25 MHz, and the cutoff frequency is about 33 MHz.

The luminance signal passed through the Y/SD analog LPF 201 is outputted to a terminal T1 of a switch circuit 204.

The luminance signal passed through the Y/HD analog LPF 202, after the amplification of a predetermined amplification factor is performed thereon by an amplifier 203, is outputted to a terminal T2 of the switch circuit 204. The luminance signal passed through the Y/HD analog LPF 202 losses gain larger than that of the luminance signal passed through the Y/SD analog LPF 201. Therefore, in order to compensate the gain difference of the luminance signal passed through the Y/HD analog LPF 202, the above-mentioned amplifier 203 is provided.

The switch circuit 204 is switched such that any of the terminals T1, T2 is alternatively selected for the terminal T3. The terminal T3 is connected to the input of an A/D converter 101A in the digital chroma demodulation system 100.

If the input component signal is the signal corresponding to the SD, by connecting the terminal T1 and the terminal T3 in the switch circuit 204, the luminance signal passed through the Y/SD analog LPF 201 is inputted to the A/D converter 101A. In addition, if the input component signal is the signal corresponding to the HD, by connecting the terminal T2 and the terminal T3 in the switch circuit 204, the luminance signal passed through the Y/SD analog LPF 201 is inputted to the A/D converter 101A.

The A/D converter 101A executes the sampling process for converting the input analog luminance signal into the digital signal. This A/D converter 101A carries out the sampling at the sampling frequency based on the system clock CLK. The system clock CLK in this case is switched between any of 13.5 MHz, 27 MHz and 74.25 MHz which correspond to the above-mentioned dot clock frequencies, in accordance with the type of the input component signal. Thus, the sampling frequency of the A/D converter 101A is switched between 13.5 MHz, 27 MHz and 74.25 MHz.

In addition, the analog color difference signal Cb is branched and inputted to a C/SD analog LPF 211 and a C/HD analog LPF 212.

Also for this case, the C/SD analog LPF 211 is the analog LPF for which the cutoff frequency of about 3 MHz is set, corresponding to the color difference signal as SD (Standard Definition). In addition, for the C/HD analog LPF 212, the cutoff frequency of about 17 MHz is set, corresponding to the color difference signal as HD (High Definition).

Also for this case, the color difference signal Cb passed through the C/SD analog LPF 211 is outputted to a terminal T1 of a switch circuit 214. The luminance signal passed through the C/HD analog LPF 212, after the amplification of a predetermined amplification factor is performed thereon by an amplifier 213 and gain-compensated, is outputted to a terminal T2 of the switch circuit 214.

In addition, in this case, if the component signal to be inputted is the signal corresponding to the SD, by connecting the terminal T1 and the terminal T3 in the switch circuit 214, the color difference signal Cb passed the C/SD analog LPF 211 is inputted to an A/D converter 101B. In addition, if the component signal to be inputted is the signal corresponding to the HD, by connecting the terminal T2 and the terminal T3 in the switch circuit 214, the luminance signal passed through the C/SD analog LPF 211 is inputted to the A/D converter 101B.

The A/D converter 101B corresponding to the input of the color difference signal Cb carries out the sampling at the sampling timing based on the system clock CLK which is assumed to be any of 13.5 MHz, 27 MHz and 74.25 MHz, in accordance with the type of the component signal to be inputted, and digitizes the color difference signal Cb.

In addition, corresponding to the input of the color difference signal Cr, the circuit section constituted with a C/SD analog LPF 221, a C/HD analog LPF 222, an amplifier 223 and a switch circuit 224 is provided at the analog stage. In addition, corresponding to the color difference signal Cr, the digital chroma demodulation system 100 is provided with an A/D converter 101C. The operations of the circuit section at the analog stage and the A/D converter 101C are similar to the case of the color difference signal Cb as mentioned above.

As can be understood from such configuration, if the processing function for the component signal is given to the conventional digital chroma demodulation system 100, it is apparent that the analog signal processing circuit system being the previous stage of the digital chroma demodulation system 100 becomes considerably complex. In other words, the two-system LPF and the switch circuit for selecting the output of those LPF are necessary for each of the signals forming the component signal. Moreover, the amplifier for the gain compensation needs to be inserted into the output of one LPF. Then, in addition to the combination of those circuits, the frequency characteristic of the signal as the HD needs to be maintained, which makes the actual circuit design difficult.

In addition, in FIG. 4, since the dot clock frequencies 27 MHz, 74.25 MHz are commonly used in one analog LPF, there are two analog LPFs. However, for the component signal of 480p, if the request in which the sampling must be performed at 27 MHz is required, the number of the analog LPFs becomes three, which causes the circuit to be further complex.

On the contrary, if the processing function for the component signal is added to the digital chroma demodulation system 1 as this embodiment shown in FIG. 1, the following configuration can be employed.

Here, in the case of carrying out the sampling as the A/D conversion by inputting the component signal as the HD, the system clock CLK (sampling frequency) at that time becomes 74.25 MHz as mentioned above.

Accordingly, the digital chroma demodulation system 1 in this embodiment, when inputting the component signal as the HD, operates the PLL circuit 24 so as to generate the system clock CLK of 74.25 MHz. Then, when the component signal or composite video signal as the SD other than it is inputted, as explained above, this is designed so as to generate the system clock CLK of the proper frequency of 71.6 MHz or 70.88 MHz which is treated as about 71 MHz.

In other words, with regard to the input of the component signal, the system clock CLK is switched between about 71 MHz (71.6 MHz or 70.88 MHz) and 74.25 MHz, and the video signal to be input is A/D-converted on the basis of the sampling frequency based on any of those system clocks CLK.

Accordingly, when it is considered that the cutoff frequency of the analog LPF to make the signal band fall in the range of the Nyquist frequency is made corresponding to each of the sampling frequencies of about 71 MHz, 74.25

MHz, for example, it may be considered that they are about 35 MHz and substantially equal.

This implies that, for example, with regard to the component signal, in spite of the fact that the signals to be inputted are the HD and the SD for each of the luminance signal and the color difference signals Cb, Cr, if it is passed through the LPF for which the cutoff frequency corresponding to the HD signal is set with about 35 MHz as the upper limit, the A/D converting process at the later stage is properly executed. In other words, at the input stage of the component signal being the previous stage of the digital chroma demodulation system 1, single analog LPF may be installed corresponding to each of the luminance signal and the color difference signals Cb, Cr.

Then, according to providing single analog LPFs, it is possible to eliminate the amplifier for compensating the gain balance.

Figure 5:
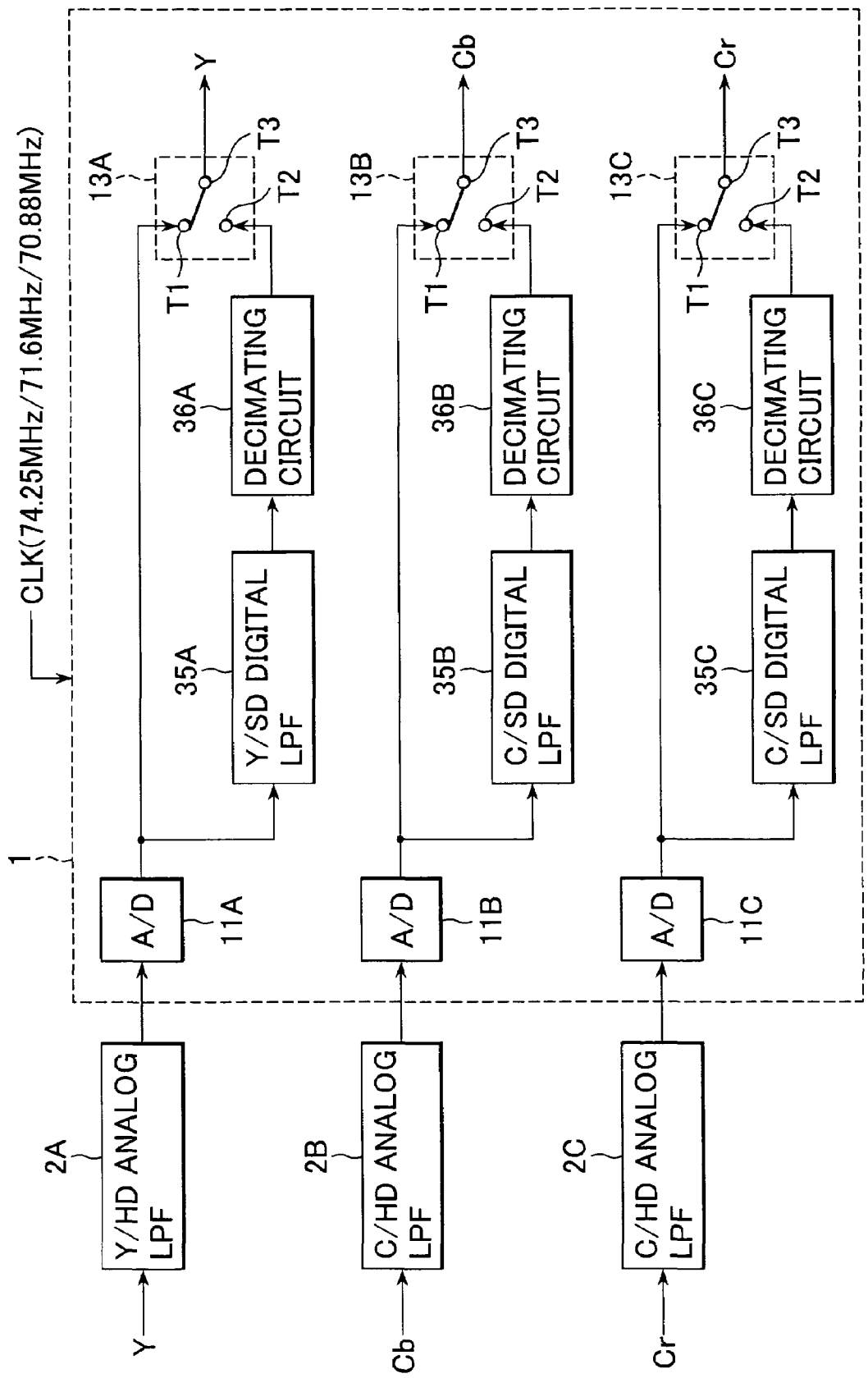
FIG. 5 is a block diagram showing a configuration example in a case of corresponding to an input of a composite video signal, in accordance with a configuration of a digital chroma demodulation system of the embodiment.

In accordance with the above-mentioned idea, the digital chroma demodulation system 1 in this embodiment which corresponds to the component signal input can employ the configuration shown in FIG. 5, including the configuration of the analog LPF at the previous stage thereof. Incidentally, also in FIG. 5, the illustration of the circuit configuration for the chroma demodulation in the composite video signal comparison shown in FIG. 1 is omitted, and only the portions with regard to the process of the component signal are picked up and indicated.

As shown in FIG. 5, at the previous stage of the digital chroma demodulation system 1, a Y/HD analog filter 2A, a C/HD analog LPF 2B and a C/HD analog LPF 2C are provided.

In other words, in spite of the fact that the types of the component signals are the SD, HD, only one analog LPF for imposing the band limit within the Nyquist frequency is configured to be installed for each signal. Incidentally, the cutoff frequency corresponding to the HD is set for each of those analog LPFs.

In this way, this embodiment has the simple circuit configuration of the previous stage in the digital chroma demodulation system 1, as compared with the case of the conventional circuit shown in FIG. 4. Consequently, as compared with the existing case, it is extremely easy to maintain the quality of the signal, which is inputted to the digital chroma demodulation system 1, at a necessary level.

In this case, among the Y/HD analog LPF 2A, the C/HD analog LPF 2B and the C/HD analog LPF 2C, as for the Y/HD analog filter 2A to which the luminance signal is inputted, for example, the filter having the same property as the Y/HD analog LPF 202 in FIG. 4 may be used. In other words, as the cutoff frequency, about 33 MHz is set to then reserve the necessary band as the digital luminance signal of the HD, and the band limit is imposed within the range of the Nyquist frequency.

Moreover, the cutoff frequency of the Y/HD analog filter 2A in this case can be regarded to be approximately equal to the analog LPF 2 shown in FIG. 1. Thus, the Y/HD analog filter 2A can be configured by the circuit equal to the analog LPF 2. In addition, it maybe considered that the Y/HD analog filter 2A and the analog LPF 2 are shared.

In addition, as for the C/HD analog LPF 2B and the C/HD analog LPF 2C, those having the same properties as the C/HD analog LPFs 212, 222 in FIG. 4 may be used. Thus, for the C/HD analog LPF 2B and the C/HD analog LPF 2C, about 7 MHz is set, corresponding to the bands of the digital color difference signals Cb, Cr of the HD.

The analog luminance signal passed through the Y/HD analog LPF 2A is inputted to an A/D converter 11A in the digital chroma demodulation system 1.

The A/D converter 11A carries out the sampling on the basis of the sampling frequency corresponding to the system clock CLK, and digitizes the input luminance signal.

As mentioned above, the frequency of the system clock CLK is 74.25 MHz when the component signal is the HD, and about 71 MHz (71.6 MHz or 70.88 MHz) when it is the SD. Thus, the luminance signal of the HD is A/D-converted on the basis of the sampling frequency of 74.25 MHz, and the luminance signal of the SD is A/D-converted on the basis of the sampling frequency of about 71 MHz (71.6 MHz or 70.88 MHz).

The luminance signal digitized by the A/D converter 11A is branched into: a route through which it is directly outputted to a terminal T1 of a switch circuit 13A; and a route through which it is outputted via a Y/SD digital LPF 35A→a decimating circuit 36A to a terminal T2 of the switch circuit 13A, and supplied.

The switch circuit 13A is switched such that the terminal T3 is alternatively connected to the terminal T1 or the terminal T2. The selection between the two routes as mentioned above is performed by the terminal switching in the switch circuit 13A.

When the input is the HD component signal, the terminal T3 is connected to the terminal T1 in the switch circuit 13A. Consequently, the HD luminance signal digitized by the A/D converter 11A is outputted directly to the circuit at the later stage.

In other words, the signal processing through the Y/HD analog LPF 2A→the A/D converter 11A is originally the operation based on the band property and the like as the HD luminance signal. Thus, when the input is the HD luminance signal, the sampling output of the A/D converter 11A should be outputted as the digital luminance signal.

On the contrary, when the input is the SD component signal, the terminal T2 is connected to the terminal T3 in the switch circuit 13A. Thus, the luminance signal is outputted from the Y/SD digital LPF 35A→the decimating circuit 36A through the switch circuit 13A.

As mentioned above, the signal processing through the Y/HD analog LPF 2A→the A/D converter 11A originally complies with the band property and the like as the HD luminance signal. However, in this embodiment, the system to digitize the signal is commonly used for the signals of the HD and the SD. Thus, if the input is the SD signal, the luminance signal digitized by the A/D converter 11A needs to be the signal based on the signal band and the sampling frequency (dot clock) complying with the original SD. The system through the Y/SD digital LPF 35A→the decimating circuit 36A is installed for this reason.

For the Y/SD digital LPF 35A, the cutoff frequency is set, so as to exhibit the band property suitable for the SD luminance signal. Then, on the luminance signal passed through the Y/SD digital LPF 35A, the decimate process is performed by the decimating circuit 36A, in such a way that the sample data equal to that sampled on the basis of the sampling frequency of the original SD is obtained. Thus, the luminance signal outputted through the switch circuit 13A from the decimating circuit 36A has the shape of the proper digital luminance signal as the HD.

Here, practically, as the SD signal, there are the case that the sampling frequency is 13.5 MHz and the case that it is 27 MHz. The cutoff frequency of the Y/SD digital LPF 35A should be switched corresponding to those sampling frequencies. For this reason, practically, for example, the Y/SD digital LPF 35A includes a coefficient ROM. Then, on the basis of the sampling frequencies of 13.5 MHz, 27 MHz, the coefficient ROM to determine the cutoff frequency of the LPF may be configured so as to be switched. In other words, the cutoff frequency of the Y/SD digital LPF 35A can be easily switched.

In addition, the circuit in the digital chroma demodulation system 1 corresponding to the color difference signal Cb passed through the C/HD analog LPF 2B is formed by configuring an A/D converter 11B, a C/SD digital LPF 35B, a decimating circuit 36B and a switch circuit 13B similarly to the circuit corresponding to the luminance signal as mentioned above.

In addition, the circuit in the digital chroma demodulation system 1 corresponding to the color difference signal Cr passed through the C/HD analog LPF 2C is designed by configuring an A/D converter 11C, a C/SD digital LPF 35C, a decimating circuit 36C and a switch circuit 13C similarly to the circuit corresponding to the color difference signal Cb.

By the way, the operations of the respective circuits formed corresponding to the color difference signals Cb, Cr constituted as mentioned above are substantially similar to the circuits corresponding to the luminance signal as mentioned above, for example, except that the cutoff frequencies in the C/SD digital LPF 35B, 35C are different from the Y/SD digital LPF 35A. Thus, their explanations are omitted here.

Due to the above-mentioned configuration, as for the color difference signals Cb, Cr, if the component signal is the HD, the HD color difference signals Cb, Cr digitized by the A/D conversion are directly outputted through the switch circuits 13B, 13C, and if it is the SD, the digital color difference signals Cb, Cr of the shape sampled suitably for the SD are outputted through [Y/SD digital LPF 35B→Decimating circuit 36B], [Y/SD digital LPF 35C→Decimating circuit 36C].

In addition, as the circuits on the color difference signals Cb, Cr sides, as for the Y/SD digital LPFs 35B, 35C, for example, switching the coefficient ROM can easily switch the cutoff frequency on the basis of the sampling frequencies of 13.5 MHz, 27 MHz.

Incidentally, the present invention is not limited to the configuration as the above-mentioned respective embodiments. For example, the digital chroma demodulation system 1 and the detail of the configuration of the previous stage thereof and the like may be suitably changed.

INDUSTRIAL APPLICABILITY

Therefore, from the above explanations, for example, when the present invention is designed so as to execute the type determination by switching the system clock frequency while directly outputting the A/D-converted composite video signal, even as the image which is displayed and outputted in accordance with this composite video signal, the disturbance in the image caused by the change in the sampling condition can be suppressed.

In addition, even in any type of the composite video signal, it is A/D-converted on the basis of the substantially constant sampling frequency. Thus, it is possible to attempt to make a simplified circuit by making the peripheral circuits and the like use commonly.

The invention claimed is:

1. A video signal processing circuit is characterized by comprising:

analog/digital converting means for inputting a composite video signal of a first system with a first color burst signal frequency, said first system and said first color burst signal frequency being different than a second system having a second color burst signal frequency, and for converting an inputted analog composite video signal to a digital composite video signal by sampling with a sampling frequency in accordance with a system clock;

video signal processing means for executing a YC separation process for separating a luminance signal and a chroma signal from said digital composite video signal and for executing a chroma demodulation process for demodulating said chroma signal obtained by said YC separation process, at a predetermined timing based on said system clock; and system clock generating means for generating said system clock synchronized with a color burst signal extracted from said digital composite video signal, and configured to change and set a coefficient n in accordance with a system of said composite video signal inputted to said video signal processing means such that the coefficient n corresponding to said first system, n1, is different from the coefficient n corresponding to said second system, n2, the product of the color burst signal frequency (fsc) of said first system and n1 being substantially equal to a frequency m, and the product of the fsc of said second system and n2 being substantially equal to said frequency m, the system clock frequency being set to m.

2. The video signal processing circuit according to claim 1 further comprising:

low-pass filter means having a cutoff frequency set in accordance with said sampling frequency of said analog/digital converting means, for passing said inputted analog composite video signal through a ban under said cut-off frequency to said analog/digital converting means.

3. The video signal processing circuit according to claim 1 further comprising:

low-pass filter means, to which said digital composite video signal outputted from said analog/digital converting means is inputted, for passing said inputted composite video signal through a band under a predetermined cut-off frequency to said video signal processing means.

4. The video signal processing circuit according to claim 1 further comprising:

a determination circuit for determining said first system or said second system of said inputted composite video signal based on a state of synchronization with said color burst extracted from said composite video signal when said system clock frequency is switched; and signal switching means for outputting a composite video signal after conversion to said digital signal by said analog/digital converting means instead of said luminance signal obtained by said video signal processing means, during said determination operation executed by said determination circuit.

5. The video signal processing circuit according to claim 1 wherein said video signal processing means is configured to execute an operation based on a system clock frequency represented by fsc× a, where a frequency of a color burst signal is defined as fsc and a coefficient is defined as a (a relation between said coefficient a and said coefficient n is a <n); and further comprising decimating sample means provided at a previous stage of said video signal processing means, for executing a sampling process on said inputted composite video signal as a digital signal based on a decimating rate determined by a relation between said coefficient a and said coefficient n.

6. The video signal processing circuit according to claim 1 wherein said system clock generating means generates a system clock of a frequency b different from a frequency m a corresponding to a component signal;

and further comprising:

analog/digital inverting means corresponding to said component signal, which is provided every predetermined number of signals forming said component signal, for converting an inputted analog composite video signal to a digital composite video signal by sampling with a sampling frequency in accordance with a system clock of said frequency b; and low-pass filter means corresponding to a component signal, which is provided at a previous stage of said analog/digital inverting means corresponding to a component signal for passing an inputted signal through a ban under a cut-off frequency set based on a sampling frequency of said analog/digital inverting means corresponding to a component signal;

wherein said coefficient n is set so that a system clock having a frequency m generated by said system clock generating means has a frequency difference that falls in a predetermined range with respect to said frequency b.

7. A video signal processing method comprising:

an analog/digital converting process for inputting a composite video signal of a first system with a first color burst signal frequency, said first system and said first color burst signal frequency being different than a second system with a second color burst signal frequency, and for converting said inputted composite video signal as an analog signal to a composite video signal as a digital signal by sampling with a sampling frequency in accordance with a system clock;

a video signal processing process for executing a YC separation operation for separating a luminance signal and a chroma signal from said composite video signal as said digital signal, and a chroma demodulation operation for demodulating said chroma signal obtained by said YC separation process, at a predetermined timing based on said system clock; and a system clock generating process for generating said system clock synchronized with said color burst signal extracted from said composite video signal, and configured to change and set a coefficient n in accordance with a system of said composite video signal inputted to said video signal processing process means such that the coefficient n corresponding to said first system, n1, is different from the coefficient n corresponding to said second system, n2, the product of the color burst signal frequency (fsc) of said first system and n1 being substantially equal to a frequency m, and the product of the fsc of said second system and n2 being substantially equal to said frequency m, the system clock frequency being set to m.

* * * * *

UNITED STATES PATENT AND TRADEMARK OFFICE
CERTIFICATE OF CORRECTION

PATENT NO. : 7,355,653 B2
APPLICATION NO. : 10/511733
DATED : April 8, 2008
INVENTOR(S) : Takatomo Nagamine, Takahiko Tamura and Jun Ueshima It is certified that error appears in the above-identified patent and that said Letters Patent is hereby corrected as shown below:

Column 2, line 27, "4 sfc and" should read --4 fsc and--;

Column 2, line 55, "maybe" should read --may be--;

Column 4, line 2, "periods" should read --period--;

Column 4, line 17, "periods" should read --period--;

Column 6, line 56, "systems is" should read --systems, are--;

Column 6, line 61, "conversion is" should read --conversion are--;

Column 9, line 23, delete "is inputted,";

Column 9, line 49, delete "further";

Column 12, line 21, "is changed," should read --are changed,--;

Column 13, line 67, "becomes same" should read --becomes the same--;

Column 15, line 53, "becomes" should read --become--;

Column 19, line 60, "maybe" should read --may be--;

Column 20, line 53, "set," should read --set--;

Column 22, line 31, "cutoff" should read --cut-off--;

UNITED STATES PATENT AND TRADEMARK OFFICE
CERTIFICATE OF CORRECTION

PATENT NO. : 7,355,653 B2
APPLICATION NO. : 10/511733
DATED : April 8, 2008
INVENTOR(S) : Takatomo Nagamine, Takahiko Tamura and Jun Ueshima It is certified that error appears in the above-identified patent and that said Letters Patent is hereby corrected as shown below:

Column 23, line 8, delete "m a".

Signed and Sealed this

Fourth Day of August, 2009

JOHN DOLL
*Acting Director of the United States Patent and Trademark Office*